(12) United States Patent
Collin

(10) Patent No.: US 7,504,445 B2
(45) Date of Patent: Mar. 17, 2009

(54) HYDRO-SEEDING MIXTURE

(75) Inventor: Cyril Collin, Benierer (FR)

(73) Assignee: SNF S.A.S., Saint Etienne (FR)

( * ) Notice: Subject to any disclaimer, the term of this patent is extended or adjusted under 35 U.S.C. 154(b) by 188 days.

(21) Appl. No.: 11/238,395

(22) Filed: Sep. 29, 2005

(65) Prior Publication Data

US 2007/0074315 A1 Mar. 29, 2007

(51) Int. Cl.
- *C09K 17/00* (2006.01)
- *B29C 47/00* (2006.01)
- *C08G 18/38* (2006.01)
- *C08F 220/12* (2006.01)

(52) U.S. Cl. .......................... 523/132; 524/13; 524/35; 524/831

(58) Field of Classification Search .................... 521/99, 521/83, 84.1, 100, 122, 123, 149; 106/22, 106/672, 674, 680, 711, 900; 405/264; 523/132; 524/13, 35, 831
See application file for complete search history.

(56) References Cited

U.S. PATENT DOCUMENTS 6,562,882 B2    5/2003    Harrison et al.

OTHER PUBLICATIONS

Vortex Argentina S.A. (http://www.vortexarg.com.ar/agricultura-eng.htm).*
PCT International Publication No. WO 00/00017 Jan. 2000. Mixture of a carrier and additives for use in germinating units containing seeds or similar growth-suited parts of a plant as well as a method of producing the mixture. AHM Poul Henrik.*
Wallace et al., "Control of Soil Erosion by Polymeric Soil Conditioners", The Williams & Wilkins Co., USA, May 1986, vol. 141, No. 5, pp. 363-367.
Nwankwo et al., "Polyacrylamide as a Soil Stabilizer for Erosion Control", Wisconsin Department of Transportation, USA, Jan. 2001, pp. i-v, 1-23.
Sojka et al., "Proceedings from Conference Held at College of Southern Idaho", University of Idaho, USA, May 1996, Publication No. 101-96, pp. 1-8.

* cited by examiner

*Primary Examiner*—Annette H Para
(74) *Attorney, Agent, or Firm*—Heslin Rothenberg Farley & Mesiti P.C.; Alana M. Fuierer, Esq.

(57) ABSTRACT

A hydro-seeding composition having the form of an aqueous mixture comprising a polyacrylamide polymer and seeds. The polyacrylamide polymer is a potassium anionic polymer salt or an ammonium anionic polymer salt, instead of a sodium-based polyacrylamide polymer. The hydro-seeding composition may also include various soil amendments. The seeds are grass seeds or plant seeds.

14 Claims, No Drawings

HYDRO-SEEDING MIXTURE

BACKGROUND OF THE INVENTION

Runoff and soil erosion from disturbed soil such as steep slope areas can be especially severe due to the potential for highly erosive rainfall and runoff and the lack of well-established plants.

Efforts are usually made to create permanent vegetative cover as quickly as possible; however, large rainfall events during critical periods of vegetation establishment can often cause extensive soil loss.

Conventional processes for providing erosion control usually involve spraying a hydro-seeding mixture. This mixture usually contains the following components: seeds (mainly grass seeds but also other native plants: flowers, brushes, trees), synthetic and/or natural soil conditioners (polyacrylamide polymers also called PAM, seaweed or plant extracts), soil amendments (such as mineral based on gypsum, lime, calcium carbonate, or organic based on crop residues or animal dejections), fertilizers (liquid or solid, organic or mineral), mulches (such as natural fibres based on straw, wood, cotton, or coco, or synthetic fibres based on paper or plastic). These components are then mixed and/or dissolved in water and finally sprayed over the area to stabilize.

Such mixtures have been shown in previous studies to improve infiltration, decrease runoff, and decrease soil loss. These studies are related in different articles written by Wallace & Wallace in the "Soil Science" Magazine such as "Control of soil erosion by polymeric soil conditioners" Volume 141, Number 5, page 363, dated May 1986. Moreover, a study report (WI 06-98) published by the Department of Transportation of Wisconsin (USA) in January 2001 clearly shows that polyacrylamide significantly reduced soil erosion and improved seed germination when used in hydroseeding compositions. For example, a test project called "CTH N" was implemented in October 1997. Data on the eroded soil of the test plot (polyacrylamide+seed) showed it was seven times smaller than the control plot (Seed only). Similar results were observed on seed germination. The seed germination rate of the test plot (polyacrylamide+seed+mulch) was 84%. This was 37% higher than that of control plot (seed+mulch).

PAM is a synthetic, high molecular weight organic water-soluble (meth)acrylamide (co)polymer. PAM can be manufactured as a neutral, cationic, anionic, or amphoteric and with varying molecular weights.

PAMs are used extensively worldwide for water and wastewater treatment, manufacturing paper, mining and drilling applications, and many other industrial applications.

The effectiveness of using a negatively charged (anionic) PAM as soil stabilizer is reported in many erosion control projects for many years (such as irrigated agriculture, construction sites, hydroseeding for slopes and highway shoulders). The present PAMs used in this industry are sodium-based polymers (see for example U.S. Pat. No. 6,562,882 which discloses the same composition as WI 06-98).

The performance of anionic PAM in controlling erosion is based on the fact it forms ionic bonds of smaller soil particles together to form larger particles. This makes the soil more resistant to the erosion forces of dispersion and shear. Further, the PAM enhances the intrusion of water into the soil, resulting in increased soil moisture to promote seed germination, lower runoff, and less soil detachment from erosion. Comparison of the PAM with other erosion control products that are currently used shows that this product is effective in controlling erosion. In addition, it is relatively inexpensive when compared to erosion mat, very easily applied, is not affected by weather conditions, and when applied following the manufacturer's recommendations is environmentally safe.

The improved process of the present invention, in one of its aspects, is to use potassium and/or ammonium based PAM (NH4/K PAM) instead of sodium-based PAM into the aforesaid hydro-seeding mixture so as to enhance the results of the process.

Specifically, the PAM of the invention may be mixed into the hydro-seeding mixture (comprising at least water and seeds) and the resulting mixture is sprayed over the soil in a water spray.

SUMMARY OF THE INVENTION

In one aspect, the present invention concerns a hydro-seeding mixture having the form of an aqueous solution comprising:
 a) PAM, wherein said PAM is a potassium and/or ammonium anionic polymer salt, and
 b) seeds.

The seeds are preferably grass seeds, but can also be from other plants such as flowers, brushes and/or trees. In yet another aspect of the invention, the hydro-seeding mixture further comprises soil amendments, such as fertilizers and/or mulches.

DETAILED DESCRIPTION

It is well known by the skilled man that sodium salts have a tendency to adversely affect the structure of soil by replacing calcium on the clay with sodium.

Sodium salts are released into the soil by the flocculation process of sodium-based PAM chains together with the soil particles.

The presence of free sodium salts causes the dispersion of clay particles and blocks the soil porosity. In excess, sodium salts can even make the soil unfertile. In many hydroseeding operations, poor seed germination and bad soil erosion control have even been reported due to the presence of sodium salts in excess.

The PAM of the invention is advantageously a copolymer of acrylamide and potassium acrylate and/or ammonium acrylate that is commercially available and sold under the Trademark Flobond™ by SNF S.A.S.

When the process of the present invention is practiced (i.e. using a non-sodium based PAM), it has been found that the effectiveness of the hydro-seeding mixture is expanded so that significantly lesser amounts of the mixture may be used.

The instant inventor has discovered that the soil being treated is more stabilized when the process of the invention is practiced, and that wind or water erosion is minimized. Also, the resulting product serves as a binder to fix the seeds onto the ground and water-retaining agent for the soil due to a better water infiltration.

It has been found surprisingly that the use of potassium and/or ammonium based PAM, having a specific charge density and a specific molecular weight, dramatically improve the soil particles flocculation but also the seed germination and the plant establishment with only one PAM addition.

The PAM anionicity may vary from 1-50 mol %, preferably from 10-40%, even more preferably from 20-35%.

The potassium and/or ammonium anionic PAM salts of the invention are water-soluble polymers, linear and/or branched, formed from one or more ethylenically unsaturated anionic monomers in combination with non-ionic monomer(s) (depending on their anionic charge degree).

The PAM can be made by gel polymerisation, inverse emulsion polymerisation, reverse phase bead polymerisation or by any other suitable technique in known manner providing water-soluble polymers.

Suitable anionic monomers are selected from the group comprising ethylenically unsaturated carboxylic or sulphonic monomers such as for example acrylic acid, methacrylic acid and 2-acrylamido-2-methyl propane sulfonic acid and their potassium and/or ammonium salts. Suitable non-ionic monomers are selected from the group comprising ethylenically unsaturated monomers such as acrylamide or methacrylamide.

Preferred anionic polymers are acrylamide and potassium and/or ammonium acrylate based copolymers of high molecular weight (>5 million g/mol, preferably >10 million g/mol) having generally 10 to 40 mol % of acrylate monomer(s).

The PAM compositions of the invention are of particular value for enhancing seed germination by reducing moisture evaporation.

The PAM will be preferably first diluted in water then mixed with the seeds. PAM dosage will range from 0.01% to 0.1% (active content) of the hydroseeding mixture.

In a specific embodiment, the PAM/seeds mixture is amended with appropriate compounds such as mulch, fertilizers, or other soil amendments.

Although mulches and soil amendments have been referred to above, any of the following compounds are effective. Mulches are made with different compounds used to cover the soil surface in order to screen atmospheric agents (i.e. light, heat, wind). They are normally based on natural fibres (i.e., straw, wood, cotton, coco) or synthetic products (i.e., paper, plastic). Soil amendments are brought to improve the physical and chemical properties of the soil. They play an essential role in the soil acidity, the organic content and take away the disturbing soil elements (sodium). These soil amendments usually are either mineral (i.e, gypsum, lime, calcium carbonate) or organic (i.e., crop residues, compost, animal dejections).

When so used the PAM also serves to bind the seed, mulch and fertilizer to the soil surface.

Therefore, while particular embodiments of the invention have been described, it is obvious that modifications may be practiced. The following claims are intended to cover all modifications, which fall within the scope of the invention.

THE FOLLOWING ARE EXAMPLES OF THE INVENTION

The PAM comparison study was initiated using a hydro-seeding mixture (10,000 litres tank) on a newly levelled road embankment with an average slope of 35%. The soil analysis gave 15% sand, 25% sandy loam, 30% loamy clay, and 30% clay.

Different polymers were tested and compared to a control plot (no polymer applied). All the polyacrylamide polymers had about the same molecular weight (12 to 15 million g/mole) and a 30% anionic charge. The only difference comes from the counter ion used for the neutralization of the acidic function (sodium, potassium or ammonia).

The hydro-seeding mixture contained the following components:
seeds=300 kg per ha
fertilizers NPK 18.18.18=200 kg per ha
cellulosic mulch (long wood fibres)=1000 kg per ha
Polyacrylamide polymer=10 kg per ha.

Each comparative treatment test had a minimum surface of 2000 $m^2$

T0=Control
Na-PAM=Sodium based polyacrylamide
K-PAM=Potassium based polyacrylamide
$NH_4$-PAM=Ammonium based polyacrylamide For application, the polymer composition was first mixed with water then the other compounds were added to the solution in the following order: fertilizer, cellulosic mulch and seeds. After an agitation of 30 minutes, the mixture was sprayed onto the embankment. Two months later, observations were carried out to evaluate soil erosion and seed emergence. During that period, a total rainfall of 156 mm was measured. Seed emergence was evaluated through a visual estimate based on the % of canopy coverage. Whereas the soil erosion was measured by placing for each treatment a collector of runoff water coming out of a $1m^2$-plot. This was replicated twice per treatment.

These results indicate that all the PAM treated plots have a much higher plant establishment than the control plot with a higher advantage for the potassium and the ammonium based polymers. In terms of soil erosion, the results are even more significant as there is a 87.7% reduction on the surface treated with a potassium based PAM, 86.8% for the ammonium based PAM and 82.6% for the sodium based PAM compared to the control.

Example 2

Soil Erosion and Water Infiltration

The objectives of these tests were to measure the quantity of soil eroded on an irrigated surface and the quantity of water infiltrated by the same soil. These tests are relevant for hydroseeding applications. The tests are done on a surface treated with a polyacrylamide-based polymer and compared with a control plot (no treatment).

Equipment:
1 plastic container with the following sizes L×l×h=0.50 m×0,10 m×0.05 m.
1 pump with a maximum outflow of 0.5 litre/minute
Scale with a precision of ±1 g
Beakers
Soil
Tap water
1 Dryer Procedure:
S0=weight in g of soil placed in a 2 cm-layer in the container (approx 1.5 kg)
W0=2000 cc a solution containing 10 ppm of active Polymer.
Pump the solution and irrigate the soil sample placed in the container with a minimum slope of 10%.
W1=weight in g of the tail water collected on the lower end of the container.
Place the tail water (W1) in the dryer to measure S1, the quantity in g of the eroded soil contained in the tail water.
For the control, repeat the test with untreated water Calculation:
Soil erosion test: % Soil erosion=(S1/S0)×100
Water infiltration test: % Infiltration water=[1−(W1−S1)/W0]×100

Results:

|  | Control (No PAM) | Na-PAM | K-PAM | NH$_4$-PAM |
| --- | --- | --- | --- | --- |
| % Soil erosion | 20-25% | 5-10% | 0-5% | 0-5% |
| % Water infiltration | 25-30% | 30-35% | 35-40% | 35-40% |

CONCLUSION

These results indicate that all the PAM treated plots have a much lower soil erosion than the control plot with a better advantage for plots treated with the potassium and the ammonium based polymers. In terms of water infiltration, the results show also significant advantages on the surface treated with potassium or ammonium based PAM with a water infiltration of 35-40% versus 30-35% on the sodium based PAM and 25-30% on the control. This water infiltration test indicates two benefits; it shows that less water will runoff on the PAM treated plots and consequently more water will penetrate the soil allowing a better water storage in the soil thus allowing a better seed germination in outside conditions.

The invention claimed is:

1. A hydro-seeding composition having the form of an aqueous mixture comprising:
   a) a water-soluble polyacrylamide polymer, wherein said polyacrylamide polymer is a potassium anionic polymer salt or an ammonium anionic polymer salt; and seeds, wherein said seeds are grass seeds or plant seeds.

2. A hydro-seeding composition according to claim 1, wherein the anionic polymer salt is formed from one or more ethylenically unsaturated anionic monomers in combination with at least one non-ionic monomer.

3. A hydro-seeding composition according to claim 2, wherein the ethylenically unsaturated anionic monomer is a potassium salt or ammonium salt of ethylenically unsaturated carboxylic or sulphonic monomers.

4. A hydro-seeding composition according to claim 2, wherein said non-ionic monomer is a ethylenically unsaturated monomer.

5. A hydro-seeding composition according to claim 1, wherein the anionic polymer salt consists of a copolymer of acrylamide and potassium acrylate or ammonium acrylate.

6. A hydro-seeding composition according to claim 1, wherein the anionic polymer salt is present in a ratio of 0.01 to 0.1 weight % in the mixture.

7. A hydro-seeding composition according to claim 1, wherein the anionicity of the anionic polymer salt varies from 1-50 mol %, preferably from 10-40 mol %, even more preferably from 20-35 mol %.

8. A hydro-seeding composition according to claim 1, wherein the anionic polymer is a copolymer of molecular weight greater than 5 million g/mol, and preferably greater than 10 million g/mol, wherein the anionic polymer comprises 10 to 40 mol % of potassium acrylate, ammonium acrylate, or a combination of potassium acrylate and ammonium acrylate.

9. A hydro-seeding method comprising the step of applying the aqueous mixture of claim 1 to the soil.

10. A hydro-seeding composition according to claim 1, wherein said plant seeds are seeds from flowers, brushes, or trees.

11. A hydro-seeding composition according to claim 1, further comprising soil amendments.

12. A hydroseeding composition according to claim 3, wherein said soil amendments are fertilizer or mulch.

13. A hydro-seeding composition according to claim 3, wherein the ethylenically unsaturated anionic monomer is selected from the group comprising acrylic acid, methacrylic acid and 2-acrylamido-2-methyl propane sulfonic acid.

14. A hydro-seeding composition according to claim 4, wherein said non-ionic monomer is selected from the group comprising acrylamide and methacrylamide.

* * * * *